…

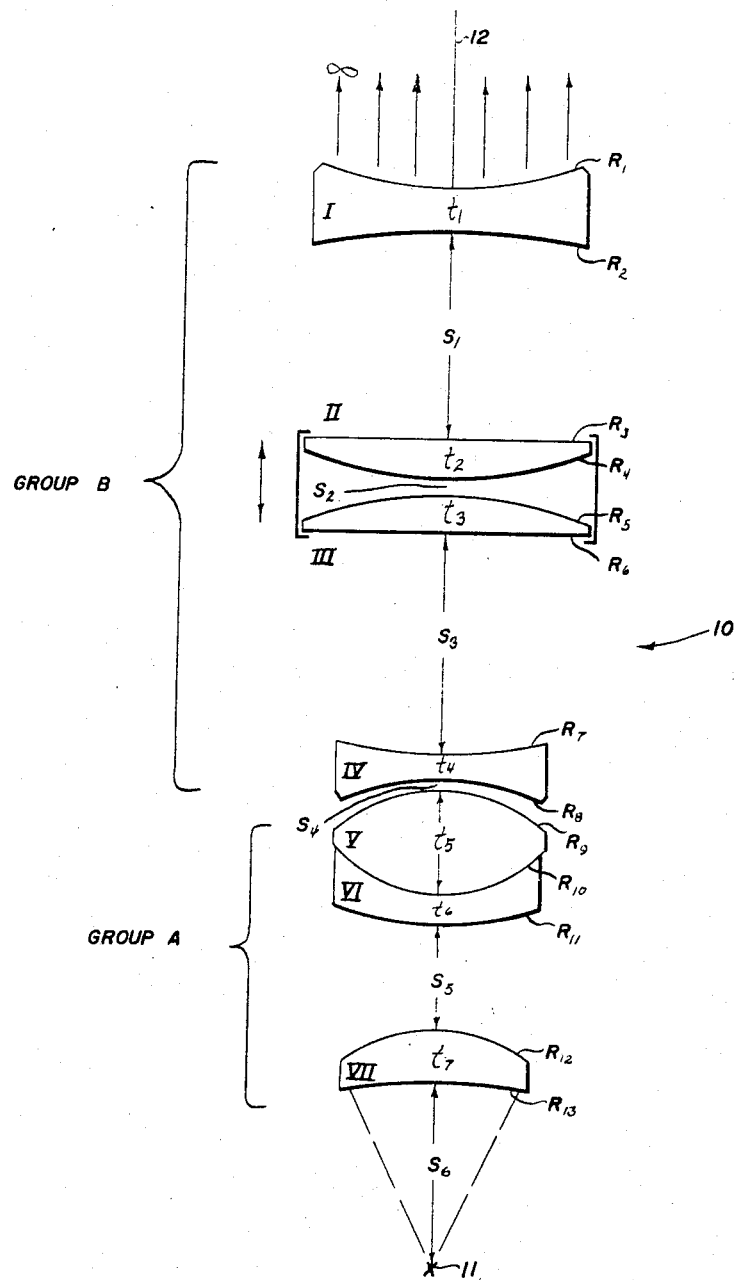

United States Patent Office

3,294,470
Patented Dec. 27, 1966

3,294,470
PANCRATIC CONDENSER FOR PROJECTORS
Ralph K. Dakin, Pittsford, Nathan Rickless, Brighton, and Paul L. Ruben, Rochester, N.Y., assignors to Bausch & Lomb, Incorporated, Rochester, N.Y., a corporation of New York
Filed July 1, 1963, Ser. No. 291,790
3 Claims. (Cl. 350—184)

The present invention relates to a pancratic optical system of the zoom type and more particularly it relates to such a system which is particularly adapted for light condensers.

As used in the art, the term "zoom" pancratic system means a continuously variable magnification of the image produced by said system as contrasted to step magnification.

It is often found advantageous when using projection measuring devices or contour projecting machines to regulate the brightness of the image on the projection screen by overfilling the effective entrance aperture of a subsequent projection device.

An object of the present invention is to provide a novel zoom type of pancratic optical system for a light condenser, said system having a zooming range of at least 2.0 so that the diameter of light beam at the effective entrance pupil of a subsequent projection system may be progressively varied to effect changes in the amount of overfilling of the pupil with light.

A further object of said invention is to provide such a device which may be manufactured at low cost by reason of the simplicity of the component optical parts.

Further objects and advantages will be found in the details of construction, and combination and arrangement of parts of the optical system, reference being had to the specification taken together with the accompanying drawing, wherein said system is illustrated in a single figure as an optical diagram showing one form of the invention.

The principal reason for overfilling the entrance aperture resides in the little realized fact that an extended incandescent lamp filament is always much hotter in the central portion than the end portions.

In the figure, the optical system is generally designated by the numeral 10 and it forms an image at infinity of a lamp filament 11. Comprised in said system 10 are light condensing lens group A which collimates the light emanating from the filament 11 and projects the light into an afocal zoom lens system designated group B which is optically aligned on an axis 12. Lens group B relays said image of the filament 11 at infinity since it is an afocal system, the beam of image rays at the exit end of group B being continuously varied in diameter by the component zoom lenses through a zoom range of at least 2.0.

According to this invention, the focal lengths of lens group A and the successive lenses in the optical system 10 are so chosen as to achieve good imagery and optical quality throughout the stated zoom range mentioned above.

In lens group A the lens nearest to the filament 11 is a singlet lens designated VII and it is constructed in the form of a positive meniscus lens having its strongest curvature located farthest from the filament. The next adjacent lens to the singlt lens VII is a compound positive lens of double convex form which is designated V,VI and is spaced rearwardly of lens VII. Said compound lens is composed of a negative meniscus lens element VI which is in contact with a positive double convex lens element V. The aforesaid singlet lens and compound lens together are so constructed as to collimate the light coming from the filament 11 and said collimated light is projected to the first lens IV of group B, said lens IV being of double concave form and being mounted in a fixed position relative to group A. Spaced rearwardly from lens IV is the compound movable zoom lens which is designated II,III, this compound lens being movable axially to vary the magnification of the image of the filament 11 and to vary the diameter of the beam of illumination produced by group B. Partly for economical manufacturing reasons, said compound lens II,III is composed of two similar lenses having the designations II,III, each lens being plano convex, said lenses being suitably fixed in spaced relation to each other so that said lenses move as a single lens. Spaced still further rearwardly from the movable zoom lens is a rearmost stationary double concave negative lens designated I from which parallel light is projected into the aforesaid subsequent projection system, not shown.

With respect to the focal lengths of the lenses constituting group A, the meniscus positive lens VII should have a focal length value between $1.166\ F_A$ and $1.424\ F_A$ where $F_A$ represents the focal length of group A. Correspondingly, the compound positive lens member of group A should have a focal length value between $2.124\ F_A$ and $2.596\ F_A$. With respect to the zoom lens group B, the double concave singlet negative lenses should have a focal length value between $2.170\ F_A$ and $2.755\ F_A$, and the duplicate positive movable lenses II and III should have a focal length value between $3.100\ F_A$ and $3.790\ F_A$.

With respect to the air space $S_4$ between group A and group B, this distance is not critical and may be specified in the table of mathematical statements herebelow along with $S_5$ representing the distance between the compound lens V,VI and the singlet lens $V_{II}$, and $S_6$ representing the distance between the singlet VII lens and filament 11.

$$.001\ F_A < S_4 < 10.000\ F_A$$
$$.201\ F_A < S_5 < .246\ F_A$$
$$.499\ F_A < S_6 < .609\ F_A$$

In the table of values given herebelow, the focal lengths of the successive lens parts are given under the designations $F_I$ to $F_{VII}$ along with the successive air spaces $S_1$ through $S_6$, and in said table the variable air spaces $S_1$ and $S_3$ are given for three typical positions of the lens II,III during its zooming movement, the numbering of the subscripts beginning on the exit side of the optical system 10. Along with the above-mentioned focal lengths and air spaces are given the successive lens element thicknesses $t_1$ to $t_7$, $2.181\ F_A < -F_I < 2.665\ F_A$
$1.552\ F_A < F(II,III) < 1.896\ F_A$
$2.255\ F_A < -F_{IV} < 2.755\ F_A$
$2.124\ F_A < F(V,VI) < 2.596\ F_A$
$1.166\ F_A < F_{VII} < 1.424\ F_A$
$.2756\ F_A < S_1 < .3368\ F_A$ (High M)
$.835\ F_A < S_1 < 1.021\ F_A$ (Intermediate M)
$1.390\ F_A < S_1 < 1.698\ F_A$ (Low M)
$.0018\ F_A < S_2 < .0228\ F_A$
$1.136\ F_A < S_3 < 1.388\ F_A$ (High M)
$.5782\ F_A < S_3 < .7068\ F_A$ (Intermediate M)
$.018\ F_A < S_3 < .0228\ F_A$ (Low M)
$.001\ F_A < S_4 < 10.000\ F_A$
$.201\ F_A < S_5 < .246\ F_A$
$.499\ F_A < S_6 < .609\ F_A$
$.148\ F_A < t_1 < .182\ F_A$
$.205\ F_A < t_2 < .251\ F_A$
$.205\ F_A < t_3 < .251\ F_A$
$.0930\ F_A < t_4 < .1136\ F_A$
$.427\ F_A < t_5 < .521\ F_A$
$.0948\ F_A < t_6 < .1158\ F_A$
$.263\ F_A < t_7 < .321\ F_A$ in which M denotes image magnification.

Further specifying the values of the focal lengths above-mentioned, the individual positive lenses II,III should have focal length values which lie between $3.103\ F_A$ and $3.793\ F_A$, and the focal lengths $F_V$ and $-F_{VI}$ should be as stated in the table of mathematical expressions herebelow, $.877\ F_A < F_V < 1.071\ F_A$ $1.295\ F_A < -F_{VI} < 1.583\ F_A$ Specifically, the values of the above-mentioned focal lengths, air spaces and lens thicknesses are given in the table of values herebelow, the designations having the same meaning as in the previous table, $-F_I = 2.423\ F_A$
$F_{(II,III)} = 1.724\ F_A$
$-F_{IV} = 2.505\ F_A$
$F_{(V,VI)} = 2.128\ F_A$
$F_{VII} = 1.296\ F_A$
$F_{II} = F_{III} = 3.448\ F_A$
$F_V = .974\ F_A$
$-F_{VI} = 1.439\ F_A$
$S_1 = .3062\ F_A$ (High M)
$S_1 = .928\ F_A$ (Intermedate M)
$S_1 = 1.544\ F_A$ (Low M)
$S_2 = .00205\ F_A$
$S_3 = 1.262\ F_A$ (High M)
$S_3 = .6425\ F_A$ (Intermediate M)
$S_3 = .0207\ F_A$ (Low M)
$S_4 = .0205\ F_A$
$S_5 = .2238\ F_A$
$S_6 = .566\ F_A$
$t_1 = .165\ F_A$
$t_2 = .228\ F_A$
$t_3 = .228\ F_A$
$t_4 = .1033\ F_A$
$t_5 = .474\ F_A$
$t_6 = .1053\ F_A$
$t_7 = .292\ F_A$ in which the symbolism used is the same as used in the preceding table.

The optical system 10 is further described by the values of the successive lens surfaces $R_1$ to $R_{13}$ along with the numerical values or absolute values of the refractive index $n_D$ and the Abbe number $\nu$ as shown in the table of mathematical statements herebelow, $1.968\ F_A < R_1 < 2.404\ F_A$
$5.42\ F_A < -R_2 < 6.62\ F_A$
$R_3 > \pm 10.0\ F_A$
$2.08\ F_A < R_4 < 2.54\ F_A$
$2.08\ F_A < -R_5 < 2.54\ F_A$
$R_6 > \pm 10.0\ F_A$
$7.17\ F_A < R_7 < 8.75\ F_A$
$1.860\ F_A < -R_8 < 2.274\ F_A$
$.960\ F_A < -R_9 < 1.174\ F_A$
$.729\ F_A < R_{10} < .891\ F_A$
$3.07\ F_A < R_{11} < 3.75\ F_A$
$.553\ F_A < -R_{12} < .677\ R_A$
$5.53\ F_A < -R_{13} < 6.77\ F_A$ Absolute values:
$1.652 < n_D(I) < 1.662$
$1.665 < n_D(II) = n_D(III) < 1.675$
$1.644 < n_D(IV) < 1.654$
$1.512 < n_D(V) < 1.522$
$1.746 < n_D(VI) < 1.756$
$1.455 < n_D(VII) < 1.522$
$33.0 < \nu(I) < 40.0$
$44.0 < \nu(II) = \nu(III) < 50.0$
$30.0 < \nu(IV) < 38.0$
$60.0 < \nu(V) < 68.0$
$24.0 < \nu(VI) < 32.0$
$60.0 < \nu(VII) < 68.0$ Still more specifically, the above-mentioned radii values along with the values of refractive index and Abbe number are given in the table herebelow, $R_1 = 2.186\ F_A$
$-R_2 = 6.02\ F_A$
$R_3 = \infty$
$R_4 = 2.31\ F_A$
$-R_5 = 2.31\ F_A$
$R_6 = \infty$
$R_7 = 7.96\ F_A$
$-R_8 = 2.067\ F_A$
$-R_9 = 1.067\ F_A$
$R_{10} = .810\ F_A$
$R_{11} = 3.41\ F_A$
$-R_{12} = .615\ F_A$
$-R_{13} = 6.15\ F_A$
$S_1 = 3.062\ F_A$ (High M)
$S_1 = .928\ F_A$ (Intermediate M)
$S_1 = 1.544\ F_A$ (Low M)
$S_2 = .00205\ F_A$
$S_3 = 1.262\ F_A$ (High M)
$S_3 = .6425\ F_A$ (Intermediate M)
$S_3 = .0207\ F_A$ (Low M)
$S_4 = .0205\ F_A$
$S_5 = .2238\ F_A$
$S_6 = .556\ F_A$
$t_1 = .165\ F_A$
$t_2 = t_3 = .228\ F_A$
$t_4 = .1033\ F_A$
$t_5 = .474\ F_A$
$t_6 = .1053\ F_A$
$t_7 = .292\ F_A$
$n_D(I) = 1.657$
$n_D(II) = n_D(III) = 1.670$
$n_D(IV) = 1.649$
$n_D(V) = 1.517$
$n_D(VI) = 1.751$
$n_D(VII) = 1.517$
$\nu(I) = 36.6$
$\nu(II) = \nu(III) = 47.2$
$\nu(IV) = 33.8$
$\nu(V) = 64.5$
$\nu(VI) = 27.8$
$\nu(VII) = 64.5$ values for $n_D$ and $\nu$ are absolute values.

With regard to the numerical values of the above-mentioned parameters, a chart is given herebelow which describes one successful form of this invention and the designations for the various parameters remain the same in the chart as in the tables given hereabove. In the chart the minus (−) sign used with the R values signifies the lens surfaces which have their centers of curvature located on the entrant side of the vertices of said surfaces.

Zoom Range=2.0   N.A.=.5 Approx.

| Lens | Radii | Focal Length | Thicknesses | Spaces | $n_D$ | $\nu$ |
|---|---|---|---|---|---|---|
| I | $R_1=105.68$ $-R_2=291.07$ | $F_I=-117.07$ | $t_1=8.0$ | $S_1=14.8$ (High) $S_1=44.8$ (Inter.) $S_1=74.8$ (Low) | 1.657 1.670 | 36.6 47.2 |
| II | $R_3=$Plano $R_4=111.69$ | $F_{II}=166.73$ | $t_2=11.0$ | $S_2=0.1$ | | |
| III | $-R_5=111.69$ $R_6=$Plano | $F_{III}=166.73$ | $t_3=11.0$ | $S_3=61.0$ (High) $S_3=31.0$ (Inter.) $S_3=1.0$ (Low) | 1.670 1.649 | 47.2 33.8 |
| IV | $R_7=383.71$ $-R_8=100.00$ | $F_{IV}=121.73$ | $t_4=5.0$ | $S_4=1.0$ | 1.517 | 64.5 |
| V | $-R_9=51.523$ $R_{10}=39.084$ | $F_V=47.04$ | $t_5=22.9$ | $S_5=10.8$ | 1.751 | 27.8 |
| VI | $R_{11}=164.44$ | $F_{VI}=-69.518$ | $t_6=5.1$ | $S_6=26.8$ | 1.517 | 64.5 |
| VII | $-R_{12}=29.648$ $-R_{13}=285.76$ | $F_{VII}=62.806$ | $t_7=14.1$ | | | |

Although only one specific form of the invention has been shown and described in detail, other forms are possible and changes may be made in the form and arrangement of parts and in the values of the optical parameters within the limits stated without departing from the spirit of this invention as defined in the claims herebelow.

What is claimed is:

1. In a light condenser, a zoom type of pancratic optical system which forms an image of a light source at various continuous magnifications within a magnification range of at least 2.0,
   said system comprising a plurality of optically aligned and axially spaced lens members which are,
   a double concave lens member designated I located on the exit side of said system farthest from said source, the surface of strongest curvature being on the exit side thereof,
   a symmetrical second lens member located on the entrant side of lens member I and composed of two similar positive lenses which are designated II and III and have duplicate convex surfaces facing and separated from each other,
   said second member being movably mounted for axial motion as a unit to vary said magnification,
   a double concave lens member designated IV located on the entrant side of said second lens member and having the surface of strongest curvature lying on the entrant side of member IV,
   a double convex compound lens member located on the entrant side of member IV and comprising a rear double convex lens element V which contacts the concave side of a convex-concavo lens element VI, and
   a foremost positive meniscus lens member designated VII and having its surface of strongest curvature facing rearwardly,
   the values for the successive lens radii $R_1$ to $R_{13}$ of the lenses I to VII, the values for the successive air spaces $S_1$ to $S_6$, the values for the axial thicknesses $t_1$ to $t_7$ of the successive lenses I to VII and the values of the refractive index $n_D$ and Abbe number $\nu$ of the optical materials from which said lenses are made being given in the table of mathematical statements herebelow, and the minus (—) sign used with the radius values applying to those lens surfaces which have their centers of curvature lying on the entrant side of the vertices of said surfaces, the quantity $F_A$ representing the equivalent focal length of lens elements V, VI and VII collectively, $R_1=2.186\ F_A$
$-R_2=6.02\ F_A$
$R_3=\infty$
$R_4=2.31\ F_A$
$-R_5=2.31\ F_A$
$R_6=\infty$
$R_7=7.96\ F_A$
$-R_8=2.067\ F_A$
$-R_9=1.067\ F_A$
$R_{10}=.810\ F_A$
$R_{11}=3.41\ F_A$
$-R_{12}=.651\ F_A$
$-R_{13}=6.15\ F_A$
$n_D$ (I)$=1.657$
$n_D$ (II)$=n_D$ (III$=1.670$)
$n_D$ (IV)$=1.649$
$n_D$ (V)$=1.517$
$n_D$ (VI)$=1.751$
$n_D$ (VII)$=1.517$
$S_1=.3062\ F_A$ (High M)
$S_1=.928\ F_A$ (Intermediate M)
$S_1=1.544\ F_A$ (Low M)
$S_2=.00205\ F_A$
$S_3=1.262\ F_A$ (High M)
$S_3=.6425\ F_A$ (Intermediate M)
$S_3=.0207\ F_A$ (Low M)
$S_4=.0205\ F_A$
$S_5=.2238\ F_A$
$S_6=.556\ F_A$
$t_1=.165\ F_A$
$t_2=t_3=.228\ F_A$
$t_4=.1033\ F_A$
$t_5=.474\ F_A$
$t_6=.1053\ F_A$
$t_7=.292\ F_A$
$\nu$ (I)$=36.6$
$\nu$ (II)$=$(III)$=47.2$
$\nu$ (IV)$=33.8$
$\nu$ (V)$=64.5$
$\nu$ (VI)$=27.8$
$\nu$ (VII)$=64.5$ values for $n_D$ and $\nu$ are absolute values.

2. In a light condenser, a zoom type of pancratic optical system which forms an image of a light source at various continuous magnifications within a magnification range of at least 2.0,
   said system comprising a plurality of optically aligned and axially spaced lens members which are,
   a double concave lens member designated I located on the exit side of said system farthest from said source, the surface of strongest curvature being on the exit side thereof,
   a symmetrical second lens member located on the entrant side of lens member I and composed of two similar positive lenses which are designated II and III and have duplicate convex surfaces facing and separated from each other,
   said second member being movably mounted for axial motion as a unit to vary said magnification,
   a double concave lens member designated IV located on the entrant side of said second lens member and having the surface of strongest curvature lying on the entrant side of member IV,
   a double convex compound lens member located on the entrant side of member IV and comprising a rear double convex lens element V which contacts the concave side of a convex-concavo lens element VI, and a foremost positive meniscus lens member designated VII and having its surface of strongest curvature facing rearwardly, the numerical values being given specifically for the optical parameters of said optical system in the chart herebelow wherein the parameters are designated by the following symbols, $F_I$ to $F_{VII}$ represent the focal lengths of the successive lens parts I to VII and the minus (—) sign used therewith designates negative focal lengths, $R_1$ to $R_{13}$ represent the radii of the successive lens surfaces numbering from the exit side of said system toward the light source, and the minus (—) sign used therewith applies to lens surfaces which have their centers of curvature located on the entrant side of the vertices of said surfaces, $t_1$ to $t_7$ represent the axial thicknesses of the successive lens parts, $S_1$ to $S_6$ represent the axial air spaces lying successively between the lens I and said light source, and $n_D$ and $\nu$ represent the refractive index and Abbe number of the optical materials from which the lenses are made,

| Lens | Radii | Focal Length | Thicknesses | Spaces | $n_D$ | $\nu$ |
|---|---|---|---|---|---|---|
| I | $R_1=105.68$ | $F_I=-117.07$ | $t_1=8.0$ | $S_1=14.8$ (High) $S_1=44.8$ (Inter.) $S_1=74.8$ (Low) | 1.657 1.670 | 36.6 47.2 |
|  | $-R_2=291.07$ |  |  |  |  |  |
| II | $R_3=$Plano | $F_{II}=166.73$ | $t_2=11.0$ | $S_2=0.1$ |  |  |
|  | $R_4=111.69$ |  |  |  |  |  |
| III | $-R_5=111.69$ | $F_{III}=166.73$ | $t_3=11.0$ | $S_3=61.0$ (High) $S_3=31.0$ (Inter.) $S_3=1.0$ (Low) | 1.670 1.649 | 47.2 33.8 |
|  | $R_6=$Plano |  |  |  |  |  |
| IV | $R_7=383.71$ | $F_{IV}=-121.73$ | $t_4=5.0$ | $S_4=1.0$ | 1.517 | 64.5 |
|  | $-R_8=100.00$ |  |  |  |  |  |
| V | $-R_9=51.523$ | $F_V=47.04$ | $t_5=22.9$ | $S_5=10.8$ | 1.751 | 27.8 |
| VI | $R_{10}=39.084$ | $F_{VI}=-69.518$ | $t_6=5.1$ | $S_6=26.8$ | 1.517 | 64.5 |
|  | $R_{51}=164.44$ |  |  |  |  |  |
| VII | $-R_{12}=29.648$ | $F_{VIII}=62.806$ | $t_7=14.1$ |  |  |  |
|  | $-R_{13}=285.76$ |  |  |  |  |  |

Zoom Range=2.0   N.A.=.5 Approx.

3. In a light condenser, a zoom type of pancratic optical system which forms an image of a light source at various continuous magnifications within a magnification range of at least 2.0, said system comprising a plurality of optically aligned and axially spaced lens members which are, a double concave lens member designated I located on the exit side of said system farthest from said source, the surface of strongest curvature being on the exit side thereof, a symmetrical second lens member located on the entrant side of lens member I and composed of two similar positive lenses which are designated II and III and have duplicate convex surfaces facing and separated from each other, said second member being movably mounted for axial motion as a unit to vary said magnification, a double concave lens member designated IV located on the entrant side of said second lens member and having the surface of strongest curvature lying on the entrant side of member IV, a double convex compound lens member located on the entrant side of member IV and comprising a rear double convex lens element V which contacts the concave side of a convex-concavo lens element VI, and a foremost positive meniscus lens member designated VII and having its surface of strongest curvature facing rearwardly, the specific values in terms of $F_A$ for the optical parameters being substantially as given in the table herebelow wherein $F_A$ represents the equivalent focal length of lens elements V, VI and VII collectively, $-F_I$ to $-F_{VI}$ designate the equivalent focal lengths of the successive lens parts, the minus (—) sign meaning negative focal length, $S_1$ to $S_6$ representing the successive axial air spaces, $t_1$ to $t_7$ representing the successive axial lens thicknesses, and $n_D$ and $\nu$ representing respectively the refractive index and Abbe number of the glasses in the lenses indicated.

$-F_I=2.423\ F_A$  
$F_{(II, III)}=1.724\ F_A$  
$-F_{IV}=2.505\ F_A$  
$F_{(V, VI)}=2.128\ F_A$  
$F_{VII}=1.296\ F_A$  
$F_{II}=F_{III}=3.448\ F_A$  
$F_V=.974\ F_A$  
$-F_{VI}=1.439\ F_A$  
$S_1=.3062\ F_A$ (High M)  
$S_1=.928\ F_A$ (Intermediate M)  
$S_1=1.544\ F_A$ (Low M)  
$S_2=.00205\ F_A$  
$S_3=1.262\ F_A$ (High M)  
$S_3=.6425\ F_A$ (Intermediate M)  
$S_3=0.207\ F_A$ (Low M)  
$S_4=.0205\ F_A$  
$S_5=.2238\ F_A$  
$S_6=.556\ F_A$ $t_1=.165\ F_A$  
$t_2=.228\ F_A$  
$t_3=.228\ F_A$  
$t_4=.1033\ F_A$  
$t_5=.474\ F_A$  
$t_6=.1053\ F_A$  
$t_7=.292\ F_A$  
$n_D$ (I)=1.657  
$n_D$ (II)=$n_D$ (III)=1.670  
$n_D$ (IV)=1.649  
$n_D$ (V)=1.517  
$n_D$ (VI)=1.751  
$n_D$ (VII)=1.517  
$\nu$ (I)=36.6  
$\nu$ (II)=$\nu$ (III)=47.2  
$\nu$ (IV)=33.8  
$\nu$ (V)=64.5  
$\nu$ (VI)=27.8  
$\nu$ (VII)=64.5

No references cited.

JEWELL H. PEDERSEN, *Primary Examiner.*
R. J. STERN, *Assistant Examiner.*

UNITED STATES PATENT OFFICE
CERTIFICATE OF CORRECTION

Patent No. 3,294,470                  December 27, 1966

Ralph K. Dakin et al.

It is hereby certified that error appears in the above numbered patent requiring correction and that the said Letters Patent should read as corrected below.

Column 3, line 75, for "$t_J$" read -- $t_7$ --; column 4, line 20, for ".677 $R_A$" read -- .677 $F_A$ --; columns 5 and 6, in the Table, under the heading "Focal Length", third column line 4 thereof, for "$F_{IV}=121.73$" read -- $F_{IV}=-121.73$ --; columns 7 and 8, in the Table, under the heading "Radii", second column, line 11 thereof, for "$R_{51}$" read -- $R_{11}$ --.

Signed and sealed this 26th day of September 1967.

(SEAL)
Attest:

ERNEST W. SWIDER                      EDWARD J. BRENNER
Attesting Officer                   Commissioner of Patents